United States Patent
Enyedy et al.

(10) Patent No.: US 9,573,216 B2
(45) Date of Patent: Feb. 21, 2017

(54) ENGINE DRIVEN WELDER WITH IMPROVED FUEL ECONOMY

(71) Applicant: LINCOLN GLOBAL, INC., City of Industry, CA (US)

(72) Inventors: Edward Enyedy, Eastlake, OH (US); Adam Hruska, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 253 days.

(21) Appl. No.: 14/477,406

(22) Filed: Sep. 4, 2014

(65) Prior Publication Data
US 2016/0067809 A1    Mar. 10, 2016

(51) Int. Cl.
| | |
|---|---|
| *B23K 9/09* | (2006.01) |
| *B23K 9/10* | (2006.01) |
| *B23K 9/095* | (2006.01) |
| *B23K 9/32* | (2006.01) |
| *F02N 11/08* | (2006.01) |

(52) U.S. Cl.
CPC ........... *B23K 9/1006* (2013.01); *B23K 9/0953* (2013.01); *B23K 9/0956* (2013.01); *B23K 9/1043* (2013.01); *B23K 9/32* (2013.01); *F02N 11/08* (2013.01)

(58) Field of Classification Search
CPC ... B23K 9/0953; B23K 9/0956; B23K 9/1006; B23K 9/1043; B23K 9/32–9/328; F02N 11/08; F02N 11/0862
USPC ................ 219/133, 134, 136, 137 R, 137 PS
See application file for complete search history.

(56) References Cited

U.S. PATENT DOCUMENTS

| | | | |
|---|---|---|---|
| 5,198,698 A * | 3/1993 | Paul | ......................... H02J 9/08 307/46 |
| 6,516,781 B2 | 2/2003 | Weisman | |
| 6,532,926 B1 | 3/2003 | Kuroda et al. | |
| 8,080,761 B2 | 12/2011 | Matthews et al. | |

(Continued)

FOREIGN PATENT DOCUMENTS

| | | |
|---|---|---|
| CN | 2190702 | 3/1995 |
| CN | 202240081 | 5/2012 |

(Continued)

OTHER PUBLICATIONS

Trailblazer 325 Diesel; Issued Sep. 2013; Index No. ED/4.8 (8 pgs.) Miller Electric Mfg. Co.; Appleton, WI 54912.

(Continued)

*Primary Examiner* — Sang Y Paik
(74) *Attorney, Agent, or Firm* — Brad C. Spencer

(57) ABSTRACT

The subject innovation relates to starting and stopping an engine of an engine driven welder based on parameters related to the welder and parameters related to an environment in which the welder operates. In an embodiment, a method for managing a welder engine of an engine driven welder includes continuously monitoring welder parameters related to the engine driven welder, continuously monitoring environmental parameters influencing the welder engine, continuously calculating a restart value based at least in part on the engine parameters and the environmental parameters, continuously monitoring activity related to the engine to maintain an activity history, and stopping the engine based at least in part on the activity history and the restart value being outside a running range. Systems include components for accomplishing such aspects.

20 Claims, 10 Drawing Sheets

(56) References Cited

U.S. PATENT DOCUMENTS

| | | |
|---|---|---|
| 8,115,450 B2 | 2/2012 | Ambrosio et al. |
| 8,338,971 B2 | 12/2012 | Radtle et al. |
| 8,658,940 B2 | 2/2014 | Reynolds et al. |
| 8,759,714 B2 | 6/2014 | Fosbinder |
| 2006/0027547 A1* | 2/2006 | Silvestro ............... B23K 9/323 219/133 |
| 2007/0024246 A1 | 2/2007 | Flaugher |
| 2007/0119403 A1* | 5/2007 | Laubender ............. F02N 11/08 123/179.3 |
| 2007/0181547 A1 | 8/2007 | Vogel et al. |
| 2008/0264922 A1* | 10/2008 | Fosbinder ............ B23K 9/1006 219/133 |
| 2008/0308541 A1 | 12/2008 | Hiroi et al. |
| 2009/0118969 A1 | 5/2009 | Heap et al. |
| 2010/0318283 A1* | 12/2010 | Renner ................... B60P 3/14 701/112 |
| 2011/0256430 A1 | 10/2011 | Stancu et al. |

FOREIGN PATENT DOCUMENTS

| | | |
|---|---|---|
| JP | 04325836 | 11/1992 |
| WO | 2014022870 A1 | 2/2014 |

OTHER PUBLICATIONS

SBDS addendum for Fuel Cell System: Initial release Apr. 11, 2007; Release 1.02.
EnPak Brochure; MillerWelds.com/enpak; #265871 Copyright 2014 Miller Electric Mfg. Co.
International Search Report and Written Opinion for PCT/IB2015/001415, dated Feb. 24, 2016.
EnPak Integrated Power System, Miller Welding, retrieved on the internet at http://www.millerwelds.com/products/enginedriven/product.php?model=M00457 on Jul. 1, 2014.
Environmentally Friendly Automatic Priming Pumps, Multiquip Inc., Copyright 2014.

* cited by examiner

US 9,573,216 B2

ENGINE DRIVEN WELDER WITH IMPROVED FUEL ECONOMY

TECHNICAL FIELD

The invention described herein pertains generally to systems and methods for starting and stopping engines of engine driven welders based on parameters concerning at least the welder and an external environment.

BACKGROUND OF THE INVENTION

Engine driven devices including welders are increasingly subjected to stringent economic and environmental constraints. In both regards, fuel efficiency is a concern. Further, emissions, engine wear, and other factors can encourage shutting down an engine when there is not an immediate need for its operation.

However, arbitrarily shutting down an engine without regard for internal and external variables influencing the engine can be, at best, an inconvenience to operators who lose time restarting the engine and reheating an electrode and/or workpiece. However, under certain conditions, such as cold weather, poor battery health, and others, an inadvertently shut-off engine may be very difficult or impossible to restart.

SUMMARY OF THE INVENTION

In accordance with the present invention, there is provided a method for managing a welder engine of an engine driven welder that includes continuously monitoring welder parameters related to the engine driven welder, continuously monitoring environmental parameters influencing the welder engine, continuously calculating a restart value based at least in part on the engine parameters and the environmental parameters, continuously monitoring activity related to the engine to maintain an activity history, and stopping the engine based at least in part on the activity history and the restart value being outside a running range.

In accordance with the present invention, there is provided an engine driven welder. The engine driven welder comprises an engine used at least in part to generate electric power for a welding operation, an engine driven welding system operatively coupled with the engine, a welder monitor component which monitors welder parameters related to the engine driven welder, an environmental monitor component which monitors environmental parameters related to an external environment, an activity monitor component which monitors activity related to the engine driven welder to maintain an activity history and a stop-start controller component which calculates a restart value based at least in part on the welder parameters and the environmental parameters. The stop-start controller component stops or starts the engine based on the activity history and a comparison of the restart value and a running range.

In accordance with the present invention, there is provided a welding system, comprising means for providing power for a welding operation, means for continuously monitoring welder parameters related to the means for providing power for a welding operation, means for continuously monitoring environmental parameters influencing the welder engine, means for continuously calculating a restart value based at least in part on the engine parameters and the environmental parameters, means for continuously monitoring activity related to the engine to maintain an activity history, and means for stopping the engine based at least in part on the activity history and the restart value being outside a running range.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The subject innovation relates to engine driven welding systems and methods for stopping and starting engines related thereto. Internal (e.g., pertaining to or influenced by the system) and external (e.g., outside or beyond the statistical influence of the system) parameters and activity levels can be evaluated to effect stopping or starting of an engine to improve reliability and efficiency. A restart value can be calculated based on variables or parameters as discussed hereafter. Based on the restart value, a controller can start or stop an engine, or take other action, to improve fuel economy without compromising reliability or other work efficiencies.

The subject innovation can be used with any suitable engine-driven welder, engine-driven welding system, engine-driven welding apparatus, a welding system powered by an engine, a welding system powered by an energy storage device, others not expressly listed, and/or combinations thereof. It is to be appreciated that any suitable system, device, or apparatus that can perform a welding operation can be used with the subject innovation and such can be chosen with sound engineering judgment without departing from the intended scope of coverage of the embodiments of the subject invention. The engine driven welder can include a power source that can be used in a variety of applications where outlet power is not available or when outlet power will not be relied on as the sole source of power including portable power generation, backup power generation, heating, plasma cutting, welding, and gouging. The example discussed herein relates to welding operations, such as arc welding, plasma cutting, and gouging operations. It is to be appreciated that a power source can generate a portion of power, wherein the portion of power is electrical power. It is to be appreciated that "power source" as used herein can include a motor, an engine, a generator, an energy storage device, a component that creates electrical power, a component that converts electrical power, or a combination thereof. By way of example and not limitation, FIGS. 1-4 illustrate welding systems or devices that can be utilized with the subject innovation. It is to be appreciated that the following welding systems are described for exemplary purposes only and are not limiting on the welding systems that can utilize the subject innovation or variations thereof.

Figure 1:
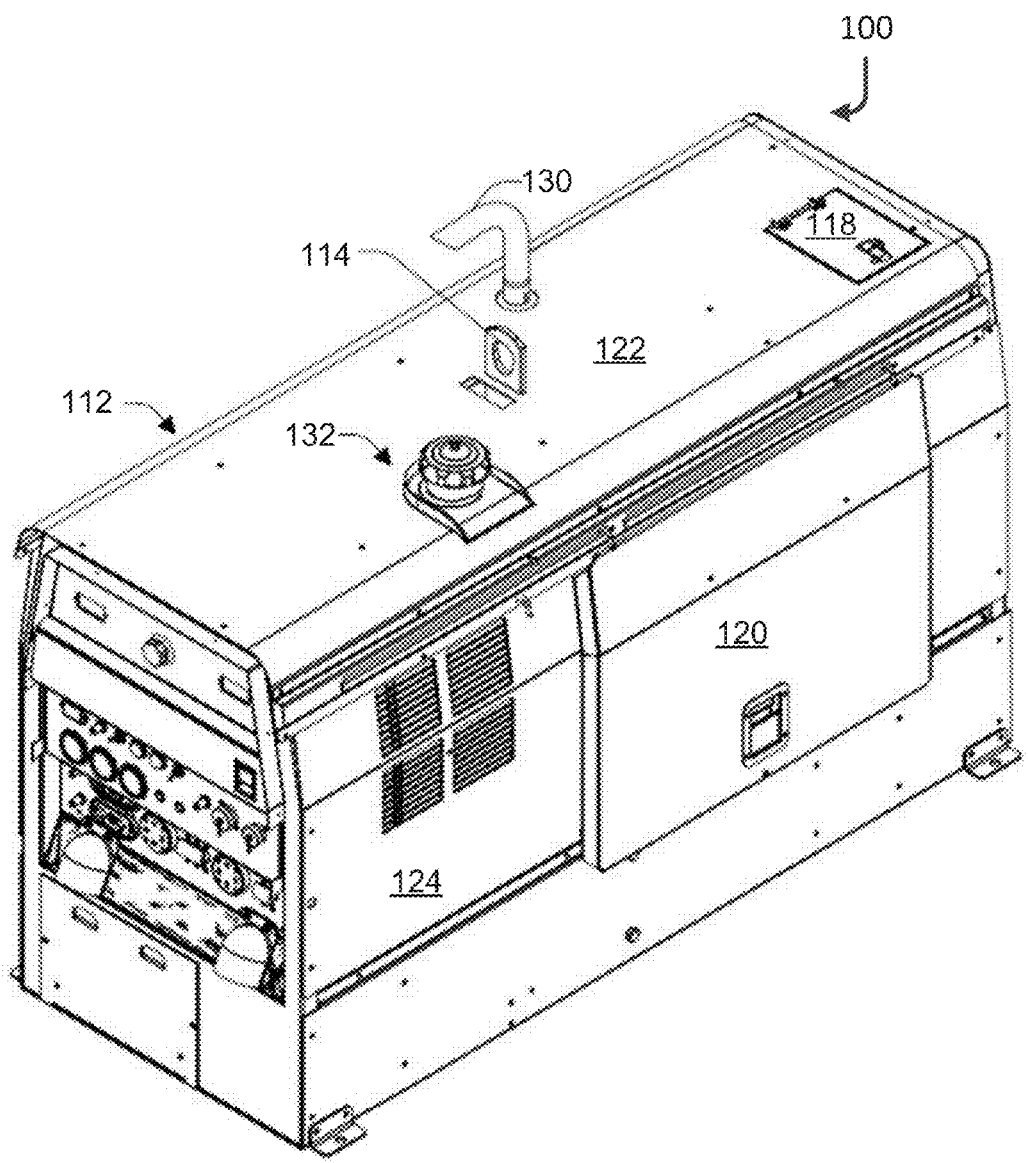
FIG. 1 is a diagram illustrating a welding device that includes a motor as a power source.

FIG. 1 illustrates a welding type device 100. The welding type device 100 includes a housing 112 which encloses the internal components of the welding device. Optionally, the welding type device 100 includes a loading eyehook 114 and/or fork recesses. The loading eyehook 114 and the fork recesses facilitate the portability of the welding type device 100. Optionally, the welding type device 100 could include a handle and/or wheels as a means of device mobility. The housing 112 also includes a plurality of access panels 118, 120. Access panel 118 provides access to a top panel 122 of housing 112 while access panel 120 provides access to a side panel 124 of housing 112. A similar access panel is available on an opposite side. These access panels 118, 120, provide access to the internal components of the welding type device 100 including, for example, an energy storage device suitable for providing welding type power. An end panel includes a louvered opening to allow for air flow through the housing 112.

The housing 112 of the welding type device 100 also houses an internal combustion engine. The engine is operatively coupled with exhaust port 130 and fuel port 132 that protrude through the housing 112. The exhaust port 130 extends above the top panel 122 of the housing 112 and directs exhaust emissions away from the welding type device 100. The fuel port 132 preferably does not extend beyond the top panel 122 or side panel 124. Such a construction protects the fuel port 132 from damage during transportation and operation of the welding type device 100.

Figure 2:
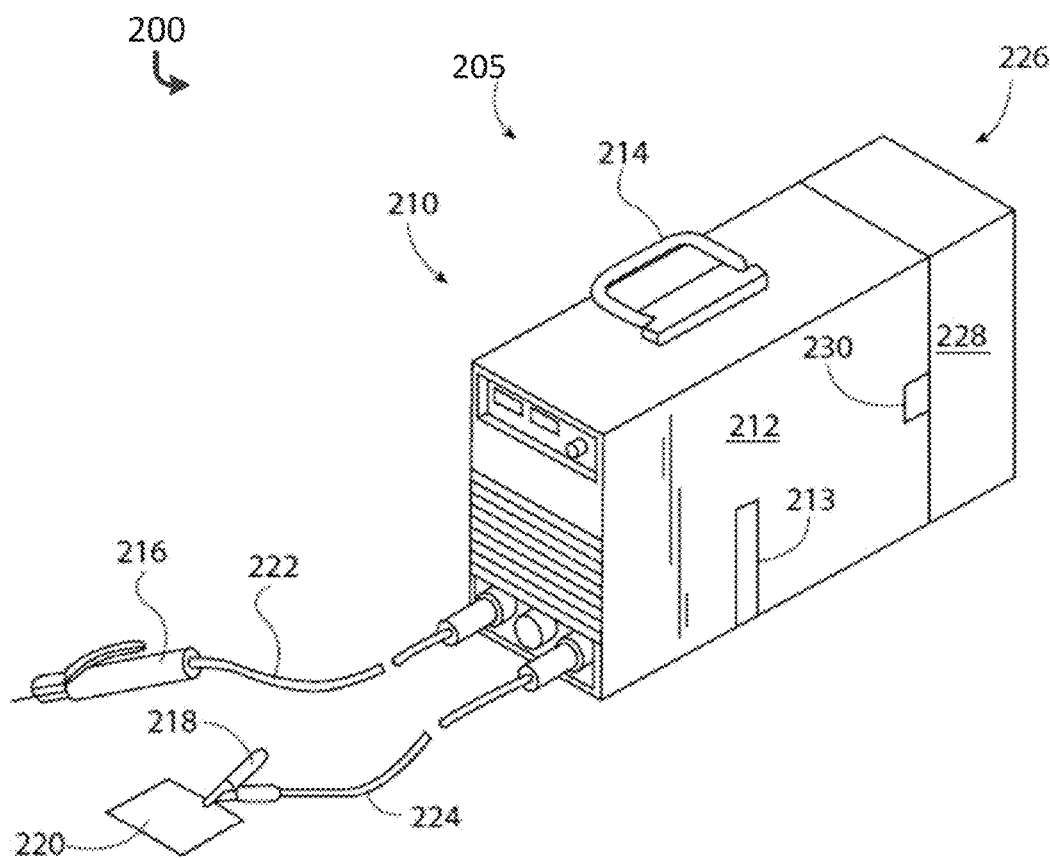
FIG. 2 is a diagram illustrating a welding device.

Referring now to FIG. 2, illustrated is a perspective view of a welding type apparatus 205 that can be utilized with the subject innovation. Welding type apparatus 205 includes a power source 210 that includes a housing 212 enclosing the internal components of power source 210. As will be described in greater detail below, housing 212 encloses control components 213. Optionally, welding type apparatus 205 includes a handle 214 for transporting the welding system from one location to another. To effectuate the welding process, welding type apparatus 205 includes a torch 216 as well as a grounding clamp 218. Grounding clamp 218 is configured to ground a workpiece 220 to be welded. As is known, when torch 216 is in relative proximity to workpiece 220, a welding arc or cutting arc, depending upon the particular welding type device, is produced. Connecting torch 216 and grounding clamp 218 to housing 212 is a pair of cables 222 and 224, respectively.

The welding arc or cutting arc may be generated, at times or in part, by the power source by conditioning raw power received from an interchangeable energy storage device 226. Energy storage device 226 is encased in a housing 228. Housing 228 is securable to the housing of welding type apparatus 205 thereby forming welding type apparatus 205. Specifically, energy storage device 226 is secured to power source 210 by way of a fastening means 230. It is contemplated that fastening means 230 may include a clip, locking tab, or other means to allow energy storage device 226 to be repeatedly secured and released from power source 210.

Figure 3:
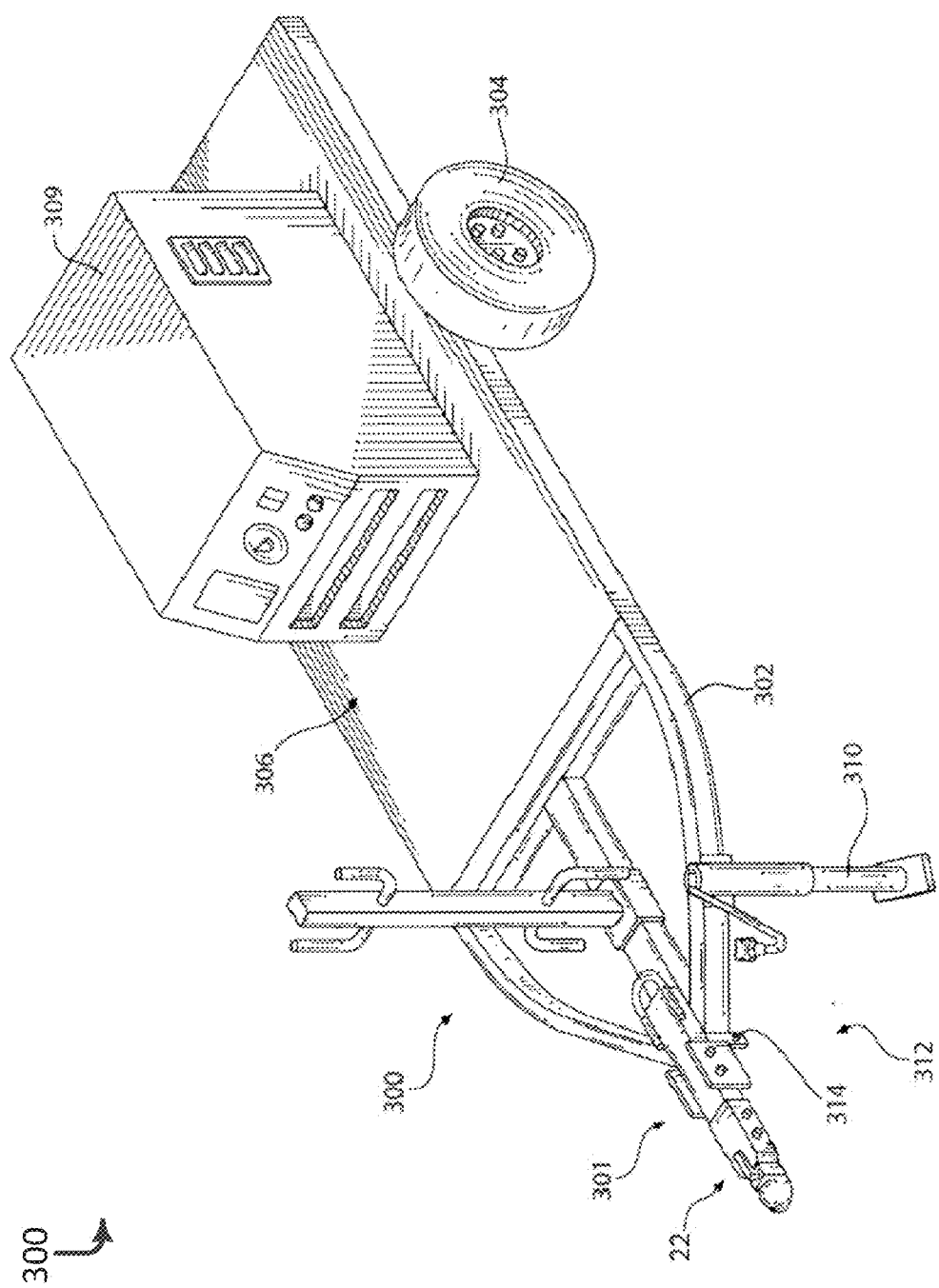
FIG. 3 is a diagram illustrating a welding device affixed to a trailer for mobility.

FIG. 3 illustrates a trailer 300 incorporating a trailer hitch or hitching device, depicted generally at 301. The trailer 300 may include a trailer frame 302 and one or more trailer wheels 304 in rotational connection with the trailer frame 302 and may further include a payload region 306 for carrying one or more cargo items, which in an exemplary manner may be a welding power supply 309 or an engine driven welding power supply 309. The trailer 300 may also include an adjustable stand 310 for adjusting the height of the front end 312 of the trailer 300. However, any means may be used for raising and/or lowering the front end 312 of the trailer 300. The trailer hitch 301 may be a generally longitudinal and substantially rigid trailer hitch 301 and may be attached to the frame 302 via fasteners 314, which may be threaded bolts.

Figure 4:
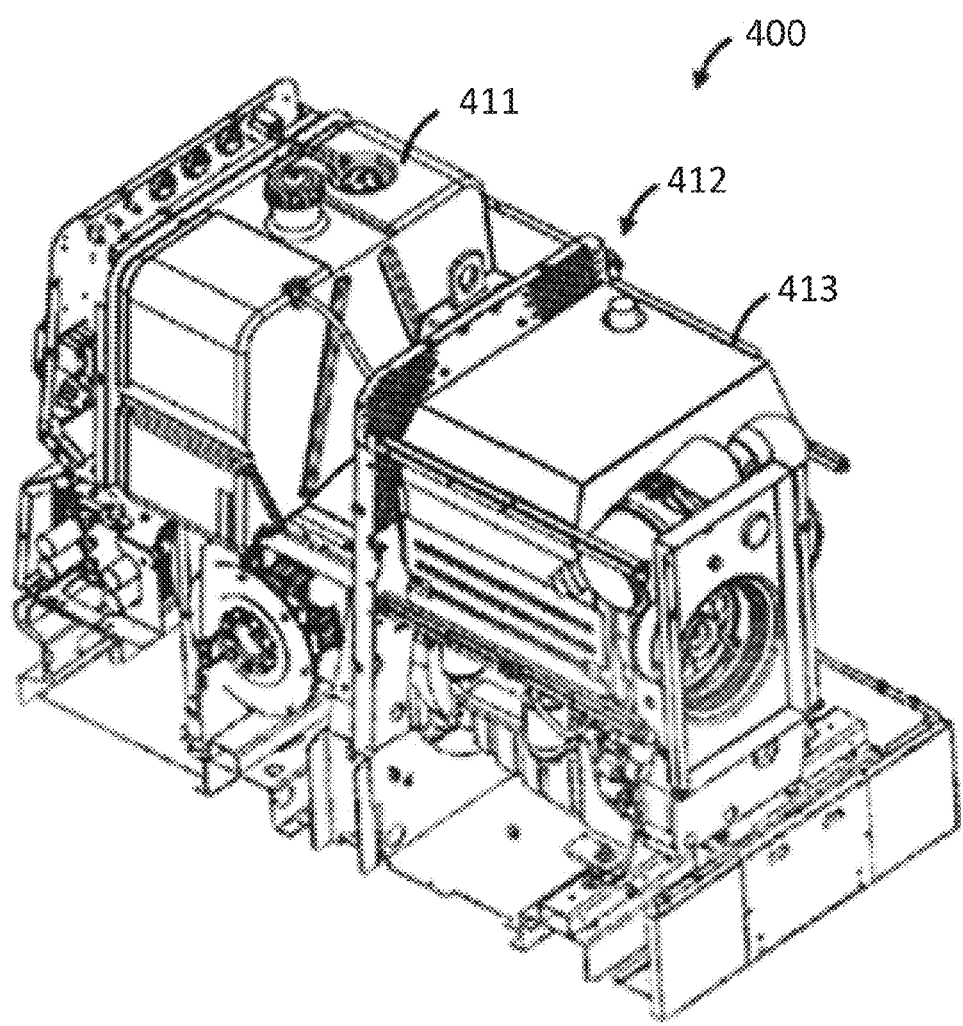
FIG. 4 is a diagram illustrating at least a portion of a welding device.

FIG. 4 illustrates a view of components common to some embodiments of aspects herein. Welder 400 is shown with internal components exposed, providing a view to fuel storage 411, motor-driven welder assembly 412, and motor 413. It will be appreciated that welder 400 may also be mounted in a permanent location depending on the application. Welder 400 generally includes a motor-driven welder assembly 412 having a motor 413 which receives fuel from fuel storage 411, permits welder 400 to be portable. In embodiments, welder 400 can be a hybrid welder and includes an energy storage device for hybrid welding. Alternatively, a battery source can be present for the operation and function of welder 400 (e.g., starting motor 413, illuminate and power controls) but which is not leveraged for welding operations. Motor 413 may be an internal combustion engine operating on any known fuel including but not limited to gasoline, diesel, ethanol, natural gas, hydrogen, and the like. These examples are not limiting as other motors or fuels may be used.

The motor 413 and other means for powering (e.g., battery power, auxiliary wired connection) may be operated individually or in tandem to provide electricity for the welding operation and any auxiliary operations powered or performed by welder 400. For example, individual operation may include operating the motor 413 and supplementing the power from the motor 413 with power from an energy storage device of a hybrid welder on an as needed basis, or supplying power from the energy storage device alone when the motor 413 is offline. Tandem operation may also include combining power from motor 413 and an auxiliary power connection (e.g., plug to outlet) to obtain a desired power output. According to one aspect of the invention, motor 413 may have less power output than ordinarily needed, and an another power source (in addition to operation of motor 413) may be used to raise it to the desired power output level. In an embodiment, a motor with no more than 19 kW (25 hp) output may be selected and supplemented with six 12 volt batteries. Other combinations of motor output may be used and supplemented with more or less power from energy storage device. The above example, therefore, is not limiting.

Embodiments for carrying out the invention will now be described for the purposes of illustrating example configurations known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 4-7 illustrate a block diagram of a welding device, and in particular, an engine driven welding device sharing elements discussed in FIGS. 1-4.

Figure 5:
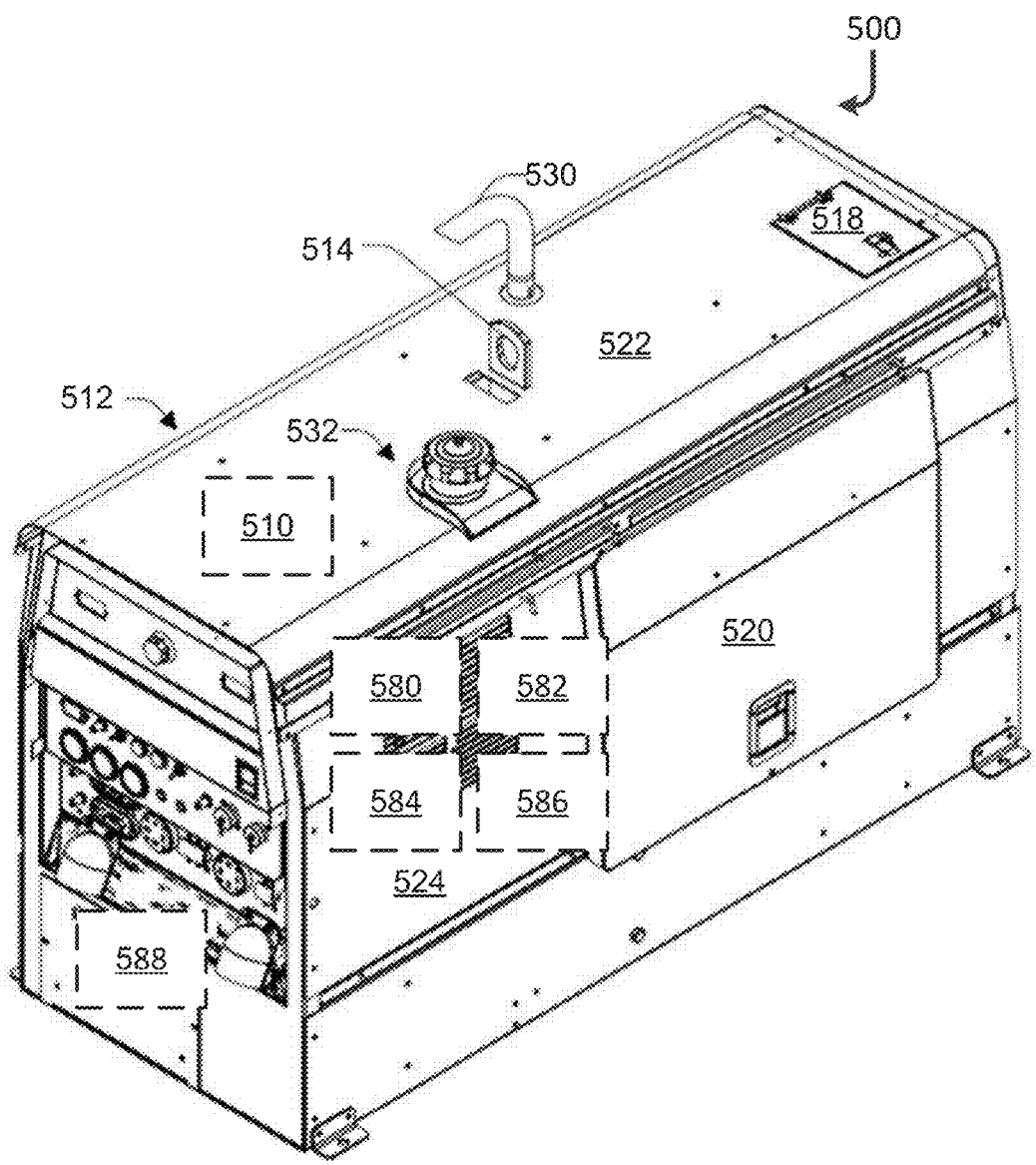
FIG. 5 is a diagram illustrating a welding device that includes a stop-start controller component.

FIG. 5 illustrates an example embodiment of a engine driven welder 500 having a stop-start controller component 580. The engine driven welder 500 includes a housing 512 which encloses the internal components of the welding device. Optionally, the engine driven welder 500 includes a loading eyehook 514 and/or fork recesses. The loading eyehook 514 and the fork recesses facilitate the portability of the engine driven welder 500. Optionally, the engine driven welder 500 could include a handle and/or wheels as a means of device mobility. The housing 512 also includes a plurality of access panels 518, 520. Access panel 518 provides access to a top panel 522 of housing 512 while access panel 520 provides access to a side panel 524 of housing 512. A similar access panel is available on an opposite side. These access panels 518, 520, provide access to the internal components of the engine driven welder 500 including, for example, an energy storage device suitable for providing welding type power. An end panel includes a louvered opening to allow for air flow through the housing 512.

The housing 512 of the engine driven welder 500 also houses an internal combustion engine 510. The engine is operatively coupled with exhaust port 530 and fuel port 532 that protrude through the housing 512. The exhaust port 530 extends above the top panel 522 of the housing 512 and directs exhaust emissions away from the engine driven welder 500. The fuel port 532 preferably does not extend beyond the top panel 522 or side panel 524. Such a construction protects the fuel port 532 from damage during transportation and operation of the engine driven welder 500.

Engine driven welder 500 also includes stop-start controller component 580 that starts, stops, or modifies operation of the internal combustion engine 510 within engine driven welder 500. Stop-start controller component 580 interacts with internal combustion engine 510 (and other components of engine driven welder 500) at least in part through signals. For example, stop-start controller component 580 can send stop signals to stop (e.g., shut off, cease combustion in) internal combustion engine 510, or start signals to start (e.g., turn on, trigger starter, initiate combustion in) internal combustion engine 510. Other signals to internal combustion engine 510 or other components will be appreciated on review of the disclosures herein. Stop-start controller component 580 receives sensor data from a variety of monitors including welder monitor component 582, environmental monitor component 584, and activity monitor component 586, and uses information from monitoring components to start, stop, or modify operation of the internal combustion engine 510.

In embodiments where the engine is controlled at least in part through digital logic, stopping, starting, and/or modifying operation of internal combustion engine 510 can be effected through transmitting signals from stop-start controller component 580 to internal combustion engine 510 or other intervening components. For example, a stop signal can be sent from stop-start controller component 580 to cause the engine to stop, and a start signal can be sent from stop-start controller component 580 to cause the engine to start (or restart). Other signals can be employed in controlling components capable of receiving signals, or other control techniques may be employed in alternative embodiments.

Welder monitor component 582 monitors welder parameters related to the engine driven welder 500. Such parameters can relate to internal combustion engine 510 or the engine driven welder 500 in general. Parameters specifically relating to internal combustion engine 510 include engine temperature, engine speed, engine maintenance status (e.g., relative or absolute health measurements relating to engine as a whole or individual engine components), and others. Parameters concerning the engine driven welder 500 in general can include fuel level, battery charge or discharge level, battery health (e.g., percentage service life remaining, percentage original charge, serviceable/unserviceable cell ratio, other relative or absolute measure of battery health), engine driven welder 500 maintenance status (e.g., relative or absolute serviceability measurements relating to device 500 as a whole or individual components of device 500), oil level, coolant level, device temperature (e.g., internal, surface, individual component), fuel consumption rate(s), and others.

Environmental monitor component 584 monitors environmental parameters external to (e.g., influencing but not influenced by) the engine driven welder 500. Environmental parameters can include air temperature, ground temperature, humidity, precipitation, wind speed, air pressure, and others.

Activity monitor component 586 monitors activity related to engine driven welder 500 to maintain an activity history. The activity history can track information related to internal combustion engine 510 or other components of engine driven welder 500 including time running, time idling, time stopped, load presence over time, load magnitude over time, number of loads, types of loads, and others. The activities monitored can include powering a welding operation, conduct of a welding operation, and others.

Using data from welder monitor component 582 and environmental monitor component 584, stop-start controller component 580 calculates a restart value. The restart value is a composite value representing the ease or difficulty of restarting internal combustion engine 510 given the conditions impacting engine driven welder 500. For example, a combination of cold weather and poor battery health can cause a restart value to indicate there will be difficulty restarting internal combustion engine 510 (e.g., low probability of first attempt restart). Alternatively, mild temperatures, strong battery health, high fuel and oil levels, and the absence of auxiliary components providing an immediate draw against power generated by internal combustion engine 510 can result in a restart value indicating there will be little or no difficulty restarting internal combustion engine 510 (e.g., high probability of first attempt restart).

Stop-start controller component 580 calculates restart values continuously or at defined intervals based on data from the welder monitor component 582 and environmental monitor component 584. Each restart value is compared to a running range. The running range is a range or set of restart values for which stop-start controller component 580 will start, or not stop, running of internal combustion engine 510. For example, if restart values are calculated between 0 (no possibility of first attempt restart) and 30 (will definitely restart on first attempt), the running range of restart values can be 10 or less. Therefore, if the restart value is at or below 10, the engine will remain running, or will be restarted, to ensure ongoing operations can be maintained. The running range may also have a lower bound (e.g., in the example above, running range is between 5 and 15) as it may be inefficient or impossible to maintain internal combustion engine 510 running below a certain threshold.

In at least one embodiment, there can be multiple restart ranges. The restart ranges can be selected by operators, or situationally adjusted. For example, during operation in areas which are partially enclosed, extended periods of idle operation can provide an incentive to reduce emissions. To accomplish such, operators may reduce the restart value to decrease time periods over which internal combustion engine 510 runs continuously. In another example, proximity to a technician, service truck, service station, or other resource capable of conveniently restarting internal combustion engine 510 can contribute to whether the selected or operative restart range is cautious (large restart range) or economical (smaller restart range).

Further, running ranges can be dynamic in one or more embodiments. In an alternative or complementary example, situational factors or operational requirements may change over time. In an embodiment, a usage history can show that peak user of engine driven welder 500 occurs between 7:00 AM and 5:00 PM. Because the likelihood of use after 5:00 PM and before 7:00 AM is low, the restart range may be made more economical during these hours. Alternatively, the restart range can be set to accord with fuel efficiency or emissions requirements, whereby arbitrary constraints (required or aspirational) are imposed for environmental reasons. Thus, running ranges can be adjusted to optimize use and reliability of engine driven welder 500 while still according with environmental or other constraints.

Stop-start controller component 580 then analyzes data from activity monitor component 586 to determine a level of activity, or lack thereof, involving engine driven welder 500. Activity can include, but is not limited to, welding operations, or the powering of welding operations. Activity can also include providing power or conducting other operations, such as powering hydraulics, compressors, or tools. For example, when a welding operation is temporarily ceased, a welder operator may use a grinder before resuming welding. The draw of the grinder can be identified as activity. Because there are many variants of welding devices including a variety of functions and attachments, activity can generally be regarded as a use of engine driven welder 500 which is completed or powered, at least in part, by engine driven welder 500 or components operatively coupled therewith.

Stop-start controller component 580 stops or starts internal combustion engine 510 based on activity data and a comparison of restart values and the running ranges. Thus, the decision to stop internal combustion engine 510 is two-prong, analyzing both activity and sensor data, whereas the decision to start internal combustion engine 510 only evaluates sensor data. Stop-start controller component 580 can assess activity in terms of instantaneous or historical activity, whereby a signal from stop-start controller component 580 to stop or start internal combustion engine 510 can be based on, e.g., usage expectations or time since last use. For example, during times of low historical usage, or after the expiration of a timeout period, the activity prong of decision to issue a stop signal can be satisfied. However, if intermittent activity prevents this prong from being satisfied, internal combustion engine 510 will be kept running. (Exceptions to this may be present in some embodiments, discussed infra.) The other prong of the determination predicating a stop or start signal is whether the restart value is within or outside the running range.

While internal combustion engine 510 may run when no activity is underway, it is less frequent for internal combustion engine 510 to be stopped when activity is underway. Generally, any current or ongoing activity will dictate that internal combustion engine 510 will be kept running. However, in embodiments, internal combustion engine 510 may be stopped during activity. For example, in embodiments where engine driven welder 500 includes hybrid battery capability, the restart value may still remain outside the running range, and battery power used to continue activity when internal combustion engine 510 is stopped.

In embodiments, activity detection, restart values, and other variables herein can be attenuated, smoothed, or averaged to avoid sporadic stopping and starting. For example, an instantaneous restart value is in the running range can be insufficient to restart internal combustion engine 510 when stopped, as the instantaneous value may be based on a numeric anomaly or incorrect data. However, if the restart value remains in the running range over a period (e.g., five measurement intervals, thirty seconds), internal combustion engine 510 can be restarted. Further, the magnitude of variables can influence the period, such that a dramatic drop in restart value requires a shorter or less restrictive period before restart, whereas a gradual movement toward the running range can employ a longer period.

In one or more embodiments, engine driven welder 500 can include override component 588. Override component 588 can be a switch, toggle, interface, input, et cetera that allows the user to override the stop-start controller component 580 directly or via signals from another component. Override component 588 overrides stop-start controller component 580 from one or both of stopping the engine or starting the engine based on parameters related to the engine and/or environment. Override component 588 can also be configured to permit manual overriding of other automated actions related to engine driven welder 500, and/or enable/disable various other components or sensors related thereto.

Generally, engine driven welder 500, if activity is detected or the restart value is within the running range, stop-start controller component 580 starts internal combustion engine 510 (or keeps internal combustion engine 510 running). Specifically, if the restart value is within the running range and internal combustion engine 510 is not running, stop-start controller component 580 starts internal combustion engine 510. If the restart value is outside the running range and no detected activity requires internal combustion engine 510 to continue running, stop-start controller component 580 stops internal combustion engine 510. If activity requiring running of internal combustion engine 510 is detected and internal combustion engine 510 is not running, stop-start controller component 580 starts internal combustion engine 510. An operator can override the activity of stop-start controller component 580 using override component 588.

Figure 6:
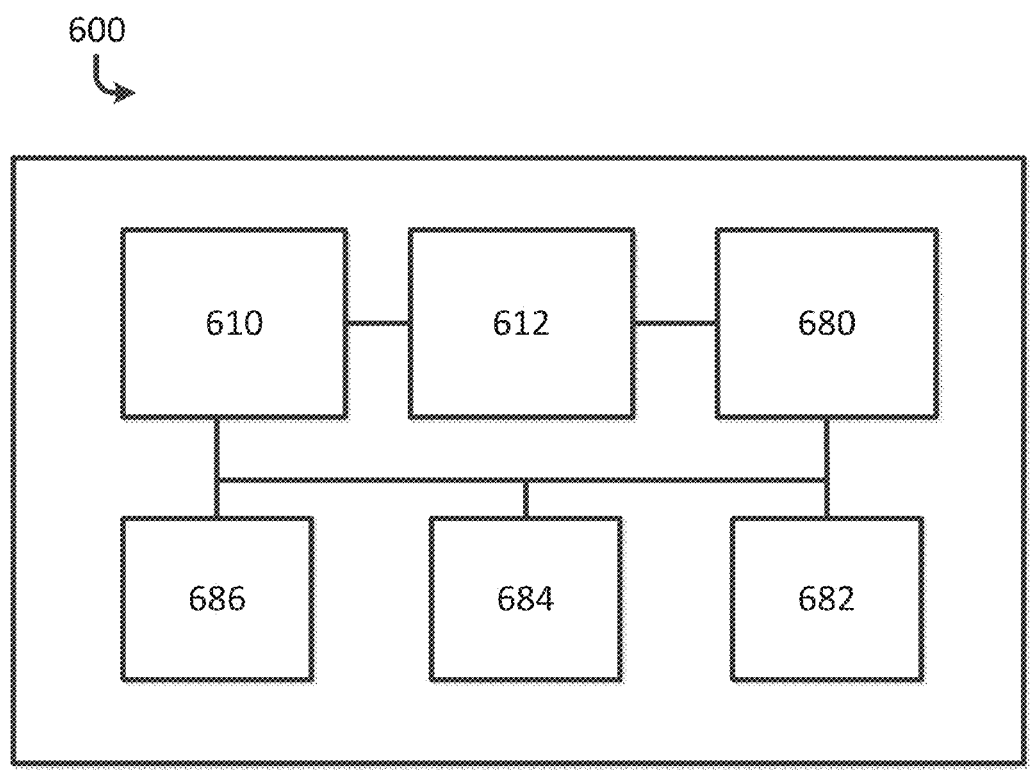
FIG. 6 is a block diagram illustrating a welding device that includes a stop-start controller.

Turning to FIG. 6, illustrated is a block diagram illustrating a welding device 600 that includes a stop-start controller 680. Similar to engine driven welder 500, welding device 600 also includes engine 610, welder monitor component 682, environmental monitor component 684, and activity monitor component 686. Welding device 600 also includes welder component 612, which can include other components associated with a welder, such as an internal/starter battery, hybrid battery bay, controls, displays, circuitry, rotor/stator assembly, sockets or connectors, and other elements found in variants of engine driven welders.

Welder monitor component 682, environmental monitor component 684, and activity monitor component 686 communicate with stop-start controller via wired and/or wireless communication. Stop-start controller component 580 can communicate with and control engine 610, and in some embodiments welder component 612, through wired or wireless communication. Further, welder monitor component 682 and activity monitor component 686 can communicate with engine 610, and, in some embodiments welder component 612, in a similar fashion. Components may communicate by way of other components or directly, and information communicated can be generated or developed by the components or received from other elements such as sensors, receivers, et cetera.

Figure 7:
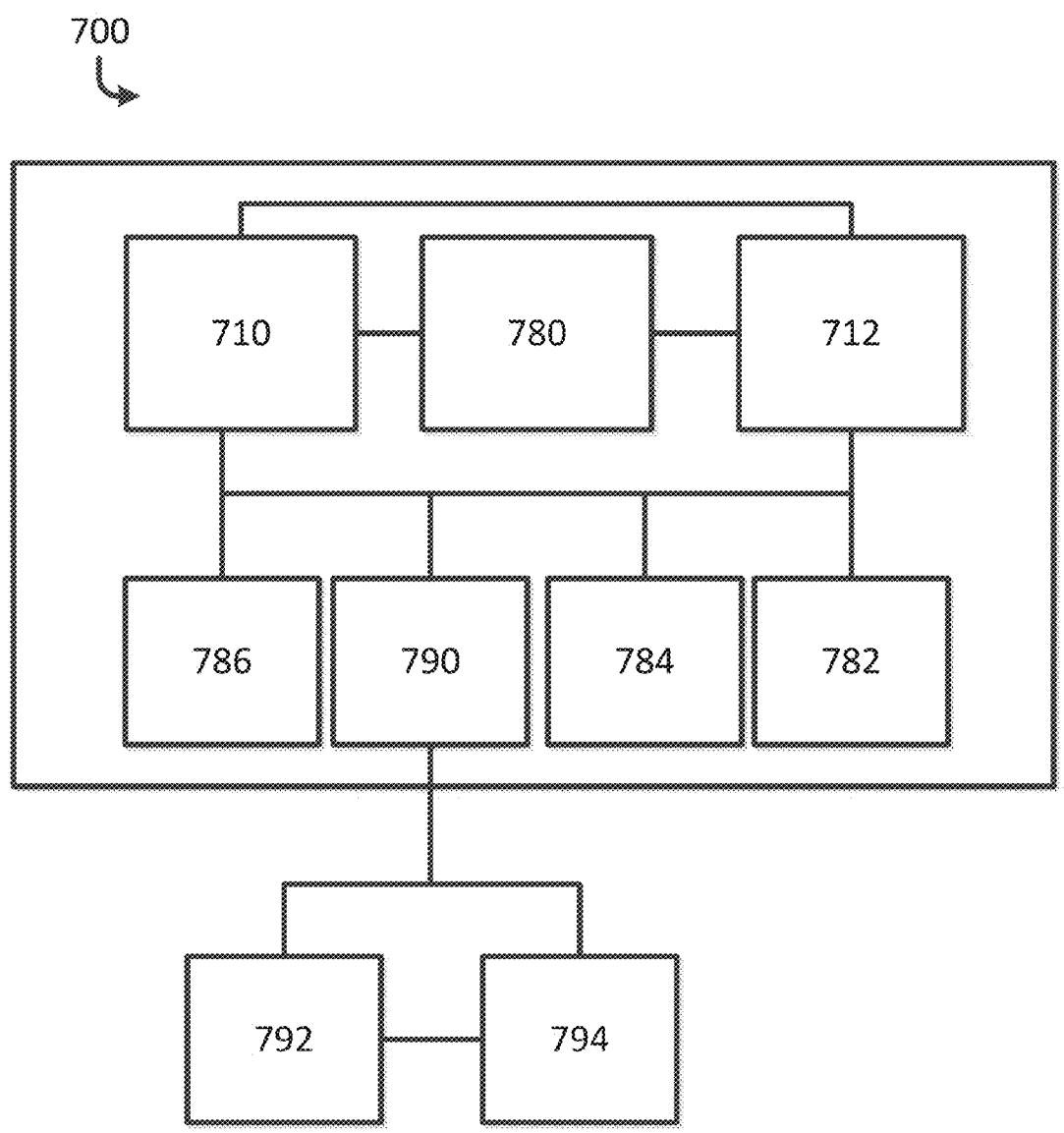
FIG. 7 is a block diagram illustrating a welding device that includes a stop-start controller component and an auxiliary component.

FIG. 7 is a block diagram illustrating a welding device 700 that includes a stop-start controller component 780 and an auxiliary component 794. Similar to engine driven welder 500, welding device 700 also includes engine 710, welder monitor component 782, environmental monitor component 784, and activity monitor component 786. Welding device 700 also includes welder component 712, which can include other components associated with a welder, such as an internal/starter battery, hybrid battery bay, controls, displays, circuitry, rotor/stator assembly, sockets or connectors, and other elements found in variants of engine driven welders.

Welder monitor component 782, environmental monitor component 784, and activity monitor component 786 communicate with stop-start controller via wired and/or wireless communication. Stop-start controller component 780 can communicate with and control engine 710, and in some embodiments welder component 712, through wired or wireless communication. Further, welder monitor component 782 and activity monitor component 786 can communicate with engine 710, and, in some embodiments welder component 712, in a similar fashion. Components may communicate by way of other components or directly, and information communicated can be generated or developed by the components or received from other elements such as sensors, receivers, et cetera.

In addition, auxiliary monitor component 790 communicates with stop-start controller component 780, as well as auxiliary component 794 and auxiliary controller component 792 via wired and/or wireless communication, directly or through one or more intervening components. Auxiliary component 794 can include one or more auxiliary features or devices attached to welding device 700, such as, e.g., a grinder, a compressor, a hydraulic element, and so forth. Auxiliary monitor component 790 provides auxiliary activity information for purposes of determining the presence, absence, or other conditions related to activity of auxiliary component 794. In alternative or complementary embodiments, auxiliary monitor component 790 can detect information related to device status, health, et cetera, to provide to stop-start controller component 780 for use in calculating a restart value including information regarding an auxiliary component. Stop-start controller component 780 can then determine whether activity is present in auxiliary component 794, or whether a calculated restart value should change based on the influence of information related to auxiliary component 794.

Particularly, in an embodiment, auxiliary monitor component 790 continuously monitors auxiliary parameters related to peripheral equipment, including auxiliary component 794, operatively coupled with the engine driven welder, and the restart value is further based at least in part on the auxiliary parameters. In an embodiment, auxiliary parameters can include a pressure value, such as when auxiliary component 794 includes pressurized attachments such as peripherals including an air compressor and/or hydraulic device. In a further embodiment, auxiliary controller component 792 can prepare the peripheral equipment for engine shutoff before stopping the engine based at least in part on the activity history and the restart value being outside a running range. For example, if a pressure value is low, auxiliary component 794 can be re-pressurized as a precondition to shutdown of engine 710.

Alternatively, activity by auxiliary component 794 can provide an activity signal similar to the signal indicating activity by welding device 700, and resultantly prevent or modify stopping of engine 710 regardless of whether the restart value is in or out of the running range.

Figure 8:
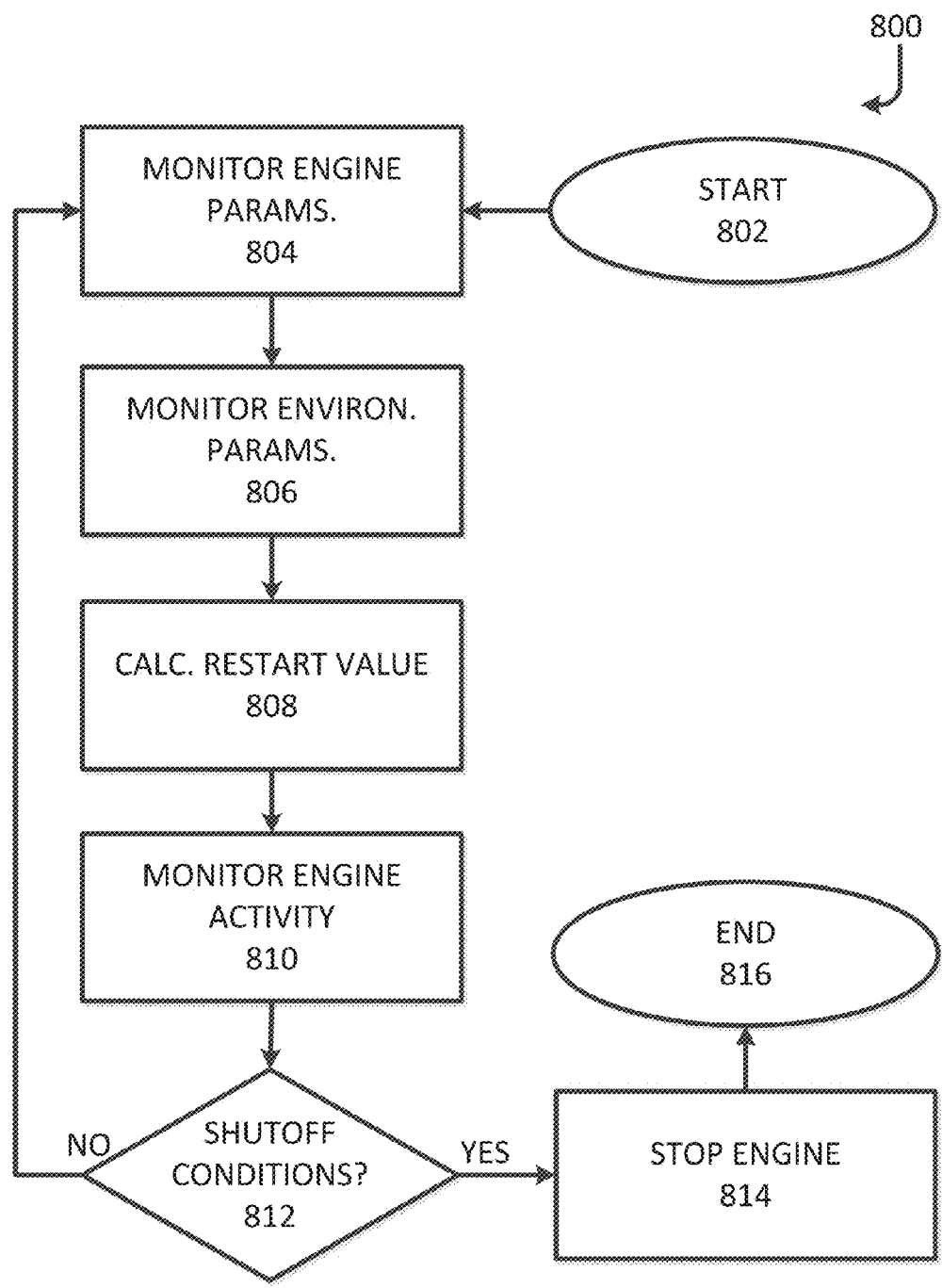
FIG. 8 is a flow diagram of a methodology for stopping an engine in an engine driven welder based on internal and external variables and parameters.

Turning now to methodologies of the disclosure, FIG. 8 is a flow diagram of a methodology 800 for stopping a running engine of an engine driven welder based on internal or external parameters. Methodology 800 begins at 802 and proceeds to 804 where engine parameters are monitored. At 806, environmental parameters are monitored. Based on the engine and environmental parameters, a restart value is calculated at 808. Activity related to the engine driven welder (or lack thereof) is identified at 810.

Thereafter, at 812, shutoff conditions are evaluated. Shutoff conditions include, but are not limited to, the restart value falling outside a running range, and an activity level falling below an activity threshold (e.g., timeout value, historical usage, usage patterns). If the shutoff conditions are not met, methodology 800 recycles to 804 where monitoring continues.

If the shutoff conditions are met at 812, methodology 800 proceeds to 814 where the engine is stopped, and methodology 800 terminates thereafter at 816.

Figure 9:
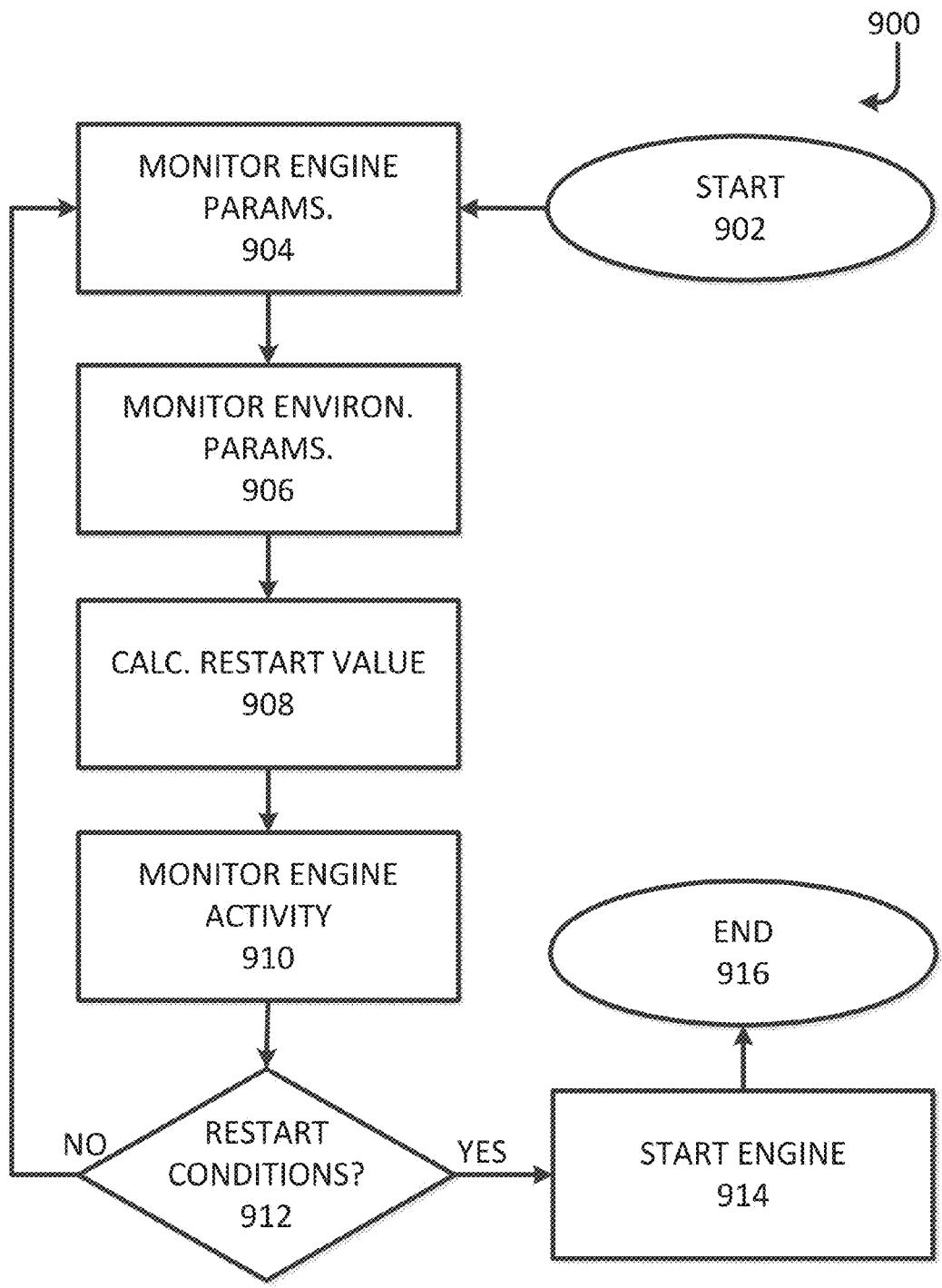
FIG. 9 is a flow diagram of another methodology for starting an engine in an engine driven welder based on internal and external variables and parameters.

FIG. 9 is a flow diagram of another methodology 900 for starting an engine in an engine driven welder based on internal or external parameters. Methodology 900 begins at 902 and proceeds to 904 where engine parameters are monitored. At 906, environmental parameters are monitored. Based on the engine and environmental parameters, a restart value is calculated at 908. Activity related to the engine driven welder (or lack thereof) is identified at 910.

Thereafter, at 912, restart conditions are evaluated. Restart conditions include, but are not limited to, the restart value re-entering a running range, or the presence of activity related to the engine driven welder. If the restart conditions are not met, methodology 900 recycles to 904 where monitoring continues.

If the restart conditions are met at 912, methodology 900 proceeds to 914 where the engine is started, and methodology 900 terminates thereafter at 916.

Figure 10:
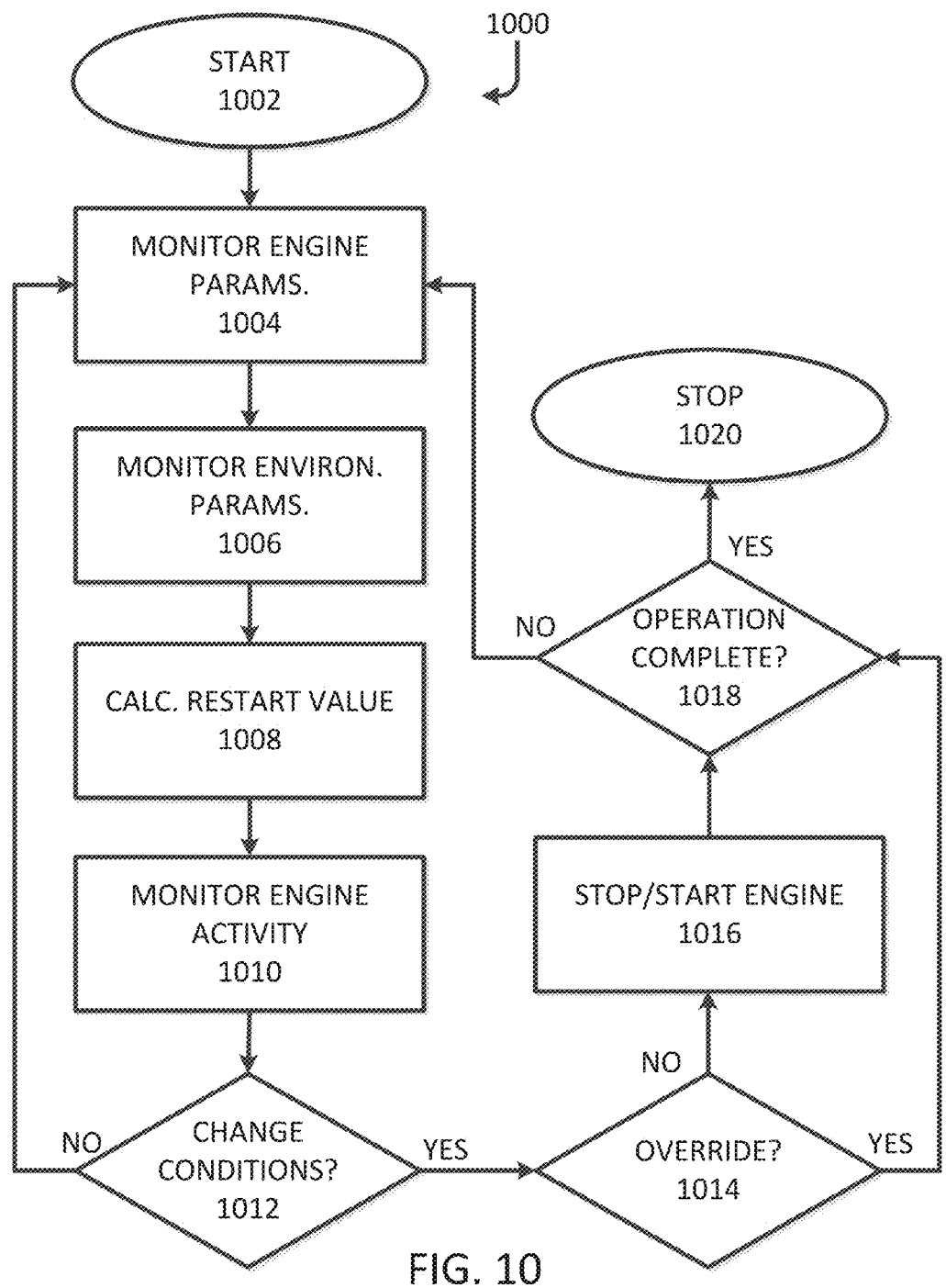
FIG. 10 is a flow diagram of a further methodology for controlling an engine in an engine driven welder based on internal and external variables and parameters.

FIG. 10 is a flow diagram of a methodology 1000 for controlling an engine in an engine driven welder based at least in part on engine parameters and environmental parameters. Methodology 1000 begins at 1002 and proceeds to 1004 where engine parameters are monitored. At 1006, environmental parameters are monitored. Based on the engine and environmental parameters, a restart value is calculated at 1008. Activity related to the engine driven welder (or lack thereof) is identified at 1010.

Thereafter, at 1012, change conditions are evaluated. Change conditions include, but are not limited to, conditions dictating that a stopped engine be started, or a running engine be stopped, in accordance with aspects herein. If the change conditions are not met, methodology 1000 recycles to 1004 where monitoring continues.

If the change conditions are met at 1012, methodology 1000 proceeds to 1014 where a determination can be made as to whether an override command is in effect (e.g., from an operator using override component 588). If the override is in effect, the change conditions are ignored, and methodology 1000 proceeds to 1018. If no override is in effect, or if there is no override capability present, methodology 1000 advances to 1016.

If no override is in effect or no override capability is present, at 1016 the engine is stopped or started, depending on the change conditions detected. Methodology 1000 thereafter proceeds to 1018 where a determination is made as to whether the operation is complete. If the operation is not complete (e.g., further welding occurring or expected, further activity related to welder occurring or expected), methodology 1000 recycles to 1004 where monitoring continues. However, if operations are determined to be complete at 1018, methodology 1000 terminates at 1020.

In an embodiment of disclosures herein, a method for managing a welder engine of an engine driven welder, comprises continuously monitoring welder parameters related to the engine driven welder, continuously monitoring environmental parameters influencing the welder engine, continuously calculating a restart value based at least in part on the welder parameters and the environmental parameters, continuously monitoring activity related to the engine to maintain an activity history, and stopping the engine based at least in part on the activity history and the restart value being outside a running range.

Further embodiments can include other aspects. For example, in the method, activity related to the engine includes powering a welding operation, and/or welder parameters include fuel consumption. The welder parameters can include a battery charge level and/or a battery health level. The method can further comprise continuously monitoring auxiliary parameters related to peripheral equipment operatively coupled with the engine driven welder, wherein the restart value is further based at least in part on the auxiliary parameters. The auxiliary parameters can include a pressure value. Such methods can further comprise preparing the peripheral equipment for engine shutoff before stopping the engine based at least in part on the activity history and the restart value being outside a running range. In still another alternative or complementary embodiment, the method can further comprise restarting the engine when the restart value re-enters the running range.

In another embodiment of disclosures herein, an engine driven welder comprises an engine used at least in part to generate electric power for a welding operation, an engine driven welding system operatively coupled with the engine, a welder monitor component which monitors welder parameters related to the engine driven welder, an environmental monitor component which monitors environmental parameters related to an external environment, an activity monitor component which monitors activity related to the engine driven welder to maintain an activity history, and a stop-start controller component which calculates a restart value based at least in part on the welder parameters and the environmental parameters. In such embodiments, the stop-start controller component stops or starts the engine based on the activity history and a comparison of the restart value and a running range.

Further aspects of such embodiments can provide that the activity related to the engine includes powering a welding operation. Welder parameters can include fuel consumption, a battery charge level and/or a battery health level. In further embodiments, the system can further include an auxiliary monitor component which monitors auxiliary parameters related to peripheral equipment operatively coupled with the engine driven welder, wherein the restart value is further based at least in part on the auxiliary parameters. In a further embodiment, the auxiliary parameters include a pressure value. In still further alternative or complementary embodiments, the system further comprises an auxiliary controller that prepares the peripheral equipment for engine shutoff before stopping the engine based at least in part on the activity history and the restart value being outside a running range.

In another embodiment, a welding system, comprises means for providing power for a welding operation, means for continuously monitoring welder parameters related to the means for providing power for a welding operation, means for continuously monitoring environmental parameters influencing the means for providing power for the welding operation, means for continuously calculating a restart value based at least in part on the welder parameters and the environmental parameters, means for continuously monitoring activity related to the engine to maintain an activity history, and means for stopping the engine based at least in part on the activity history and the restart value being outside a running range.

Further embodiments comprise means for continuously monitoring auxiliary parameters related to peripheral equipment operatively coupled with the means for providing power for the welding operation, wherein the restart value is based at least in part on the auxiliary parameters. The welding system can also include, in alternative or complementary embodiments, means for preparing the peripheral equipment for engine shutoff before stopping the engine based at least in part on the activity history and the restart value being outside a running range. Welder parameters can include fuel consumption, a battery charge level and/or a battery health level.

While the embodiments discussed herein have been related to the systems and methods discussed above, these embodiments are intended for purposes of example and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

While aspects herein have been directed toward the storage of electrodes used in welding operations, it is understood that one or more compartments may be configured for storage of other material. Further, while specific types of exchangers are discussed in terms of harnessing products or byproducts for environmental control, those of skill in the art will appreciate other sources (e.g., other components of welding systems that generate heat through use) of energy which can be repurposed for controlling environmental parameters. Further, while portions of this disclosure are directed toward heating or reducing moisture, such aspects are described as possible embodiments presenting descriptive examples, and should not be interpreted as exhaustive or required. Other parameter control procedures including humidifying, cooling, and so forth can be utilized herein without departing from the scope or spirit of the innovation. In at least one embodiment, at least a portion of an environmentally controlled electrode storage compartment can intentionally contain a substance which modifies the characteristics of stored electrodes to prepare the electrode for operation, or facilitate the manifestation of particular characteristics in its use.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims. Obviously, modifications and alterations will occur to others upon the reading and understanding of the specification. It is intended to include all such modifications and alterations insofar as they come within the scope or spirit of the appended claims, or the equivalents thereof.

What is claimed is:

1. A method for managing a welder engine of an engine driven welder, comprising:
   continuously monitoring welder parameters related to the engine driven welder;
   continuously monitoring environmental parameters influencing the welder engine;
   continuously calculating a restart value based at least in part on the welder parameters and the environmental parameters, wherein the restart value indicates a likelihood that the welder engine will restart upon a first restart attempt;
   continuously monitoring activity related to the welder engine to maintain an activity history;
   comparing the restart value to a running range, wherein the running range comprises a range of restart values for keeping the welder engine running; and
   transmitting a stop signal to stop the welder engine based at least in part on the activity history, and the restart value being outside of the running range.

2. The method of claim 1, wherein the activity related to the welder engine includes powering a welding operation.

3. The method of claim 1, wherein welder parameters include fuel consumption.

4. The method of claim 1, wherein the welder parameters include a battery charge level and/or a battery health level.

5. The method of claim 1, further comprising:
   continuously monitoring auxiliary parameters related to peripheral equipment operatively coupled with the welder engine driven welder,
   wherein the restart value is further based at least in part on the auxiliary parameters.

6. The method of claim 5, wherein the auxiliary parameters include a pressure value.

7. The method of claim 5, further comprising preparing the peripheral equipment for engine shutoff before stopping the welder engine based at least in part on the activity history, and the restart value being outside of the running range.

8. The method of claim 1, further comprising transmitting a restart signal to restart the welder engine when the restart value re-enters the running range.

9. The method of claim 1, further comprising overriding the stop signal to leave the welder engine running.

10. An engine driven welder, comprising:
    an engine used at least in part to generate electric power for a welding operation;
    an engine driven welding system operatively coupled with the engine;
    a welder monitor component which monitors welder parameters related to the engine driven welder;
    an environmental monitor component which monitors environmental parameters related to an external environment;
    an activity monitor component which monitors activity related to the engine driven welder to maintain an activity history; and
    a stop-start controller component which calculates a restart value based at least in part on the welder parameters and the environmental parameters, wherein the restart value indicates a likelihood that the engine will restart upon a first restart attempt, and
    wherein the stop-start controller component stops or starts the engine based on the activity history, and a comparison of the restart value and a running range, wherein the running range comprises a range of restart values for keeping the engine running.

11. The welder of claim 10, wherein the activity related to the engine includes powering a welding operation.

12. The welder of claim 10, wherein the welder parameters include a battery charge level and/or a battery health level.

13. The welder of claim 10, further comprising:
    an auxiliary monitor component which monitors auxiliary parameters related to peripheral equipment operatively coupled with the engine driven welder,
    wherein the restart value is further based at least in part on the auxiliary parameters.

14. The welder of claim 13, wherein the auxiliary parameters include a pressure value.

15. The welder of claim 13, further comprising an auxiliary controller that prepares the peripheral equipment for engine shutoff before stopping the engine based at least in part on the activity history, and the restart value being outside of the running range.

16. The welder of claim 13 further comprising an override component that overrides the stop-start controller component with regard to stopping or starting the engine based on the activity history and the comparison of the restart value and the running range.

17. A welding system, comprising:
- means for providing power for a welding operation, wherein the means for providing power includes an internal combustion engine;
- means for continuously monitoring welder parameters related to the means for providing power for a welding operation;
- means for continuously monitoring environmental parameters influencing the means for providing power for the welding operation;
- means for continuously calculating a restart value based at least in part on the welder parameters and the environmental parameters, wherein the restart value indicates a likelihood that the internal combustion engine will restart upon a first restart attempt;
- means for continuously monitoring activity related to the internal combustion engine to maintain an activity history;
- means for comparing the restart value to a running range, wherein the running range comprises a range of restart values for keeping the internal combustion engine running; and
- means for stopping the internal combustion engine based at least in part on the activity history, and the restart value being outside of the running range.

18. The welding system of claim 17, further comprising:
- means for continuously monitoring auxiliary parameters related to peripheral equipment operatively coupled with the means for providing power for the welding operation,
- wherein the restart value is based at least in part on the auxiliary parameters.

19. The welding system of claim 18, further comprising means for preparing the peripheral equipment for engine shutoff before stopping the internal combustion engine based at least in part on the activity history, and the restart value being outside of the running range.

20. The welding system of claim 18, wherein the welder parameters include a battery charge level and/or a battery health level.

* * * * *